United States Patent
Hall-Holt et al.

(10) Patent No.: US 6,754,370 B1
(45) Date of Patent: Jun. 22, 2004

(54) REAL-TIME STRUCTURED LIGHT RANGE SCANNING OF MOVING SCENES

(75) Inventors: Olaf A. Hall-Holt, Stanford, CA (US); Szymon M. Rusinkiewicz, Mountain View, CA (US)

(73) Assignee: The Board of Trustees of The Leland Stanford Junior University, Stanford, CA (US)

(*) Notice: Subject to any disclaimer, the term of this patent is extended or adjusted under 35 U.S.C. 154(b) by 568 days.

(21) Appl. No.: 09/639,716

(22) Filed: Aug. 14, 2000

(51) Int. Cl.[7] .............................. G06K 9/00; G01C 3/00
(52) U.S. Cl. ............................ 382/106; 382/107; 356/3
(58) Field of Search ................................ 382/106, 107, 382/154; 356/3–22, 3.01

(56) References Cited

U.S. PATENT DOCUMENTS

| | | | | |
|---|---|---|---|---|
| 4,175,862 A | * | 11/1979 | DiMatteo et al. | 356/610 |
| 4,270,143 A | * | 5/1981 | Morris | 348/169 |
| 4,653,104 A | * | 3/1987 | Tamura | 382/154 |
| 4,841,377 A | * | 6/1989 | Hiratsuka et al. | 358/3.08 |
| 4,846,577 A | | 7/1989 | Grindon | 356/376 |
| 4,870,692 A | * | 9/1989 | Zuiderveld et al. | 382/107 |
| 5,012,522 A | * | 4/1991 | Lambert | 382/118 |
| 5,023,922 A | * | 6/1991 | Abramovitz et al. | 382/313 |
| 5,509,090 A | * | 4/1996 | Maruyama et al. | 382/276 |
| 5,589,942 A | * | 12/1996 | Gordon | 356/611 |
| 5,832,107 A | * | 11/1998 | Choate | 382/154 |
| 5,986,745 A | * | 11/1999 | Hermary et al. | 356/3.03 |
| 6,043,802 A | * | 3/2000 | Gormish | 345/596 |
| 6,201,899 B1 | * | 3/2001 | Bergen | 382/284 |
| 2002/0126875 A1 | * | 9/2002 | Naoi et al. | 382/104 |

FOREIGN PATENT DOCUMENTS

| JP | 07-091927 | * | 7/1995 |
|---|---|---|---|
| JP | 08-029136 | * | 2/1996 |

OTHER PUBLICATIONS

K. L. Boyer and A. C. Kak, "Color–Encoded Structured Light for Rapid Active Ranging," IEEE Transactions on Pattern Analysis and Machine Intelligence, vol. Pami–9, No. 1 Jan. 1987, pp. 14–28.

Marc Proesmans, Luc Van Gool and A. Oosterlinck, "One-–Shot Active 3D Shape Acquisition," IEEE, Proceedings of ICPR'96, pp. 336–340.

* cited by examiner

Primary Examiner—Daniel Mariam
Assistant Examiner—Shefali Patel
(74) Attorney, Agent, or Firm—Lumen Intellectual Property Services, Inc.

(57) ABSTRACT

A method for range scanning consists of projecting a sequence of radiation patterns onto a scene, capturing images of the scene, determining correspondences between image features and projection pattern features, and computing a range image of the scene by triangulation of the correspondences. Novel projection patterns allow tracking of pattern features between images, so that range images can be computed for moving scenes in real time. Global assumptions about surface continuity or reflectivity of the scene are not required for successful range scanning. Projection patterns may be based on two-stripe codes, parallel stripes of bright and dark intensity. In two-stripe coded patterns, pattern features are the boundaries between stripes, which take on values of either on-on, on-off, off-on, or off-off. A particular boundary's value over the entire pattern sequence defines its code, used to determine correspondences between the boundary image and its location in the projection pattern. The method is also useful for obtaining three-dimensional models of static objects. The object is slowly rotated while being imaged, and all resulting range images are aligned and merged to form the three-dimensional model. A system implementing the method can be mounted on a robot or vehicle for navigation in unknown environments.

70 Claims, 10 Drawing Sheets

$b_1$ 11 10 01 00 01
$b_2$ 10 01 10 01 11
$b_3$ 00 10 01 11 10
$b_4$ 01 00 11 10 01

| Pixel Column | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Pattern 1 | 1 | 1 | 0 | 1 | 0 | 1 | 0 | 0 | 1 | 0 | 0 | 0 | 1 | 1 |
| Pattern 2 | 1 | 0 | 1 | 0 | 1 | 1 | 0 | 0 | 1 | 1 | 1 | 0 | 1 | 0 |
| Pattern 3 | 1 | 1 | 1 | 0 | 0 | 0 | 0 | 1 | 1 | 1 | 0 | 0 | 1 | 0 |

REAL-TIME STRUCTURED LIGHT RANGE SCANNING OF MOVING SCENES

FIELD OF THE INVENTION

This invention relates generally to non-contact methods for obtaining three-dimensional or range measurements of objects. More particularly, it relates to a structured light (or other radiation) range scanner using projected patterns that permit real-time range measurements of moving scenes with minimal surface continuity and reflectivity assumptions.

BACKGROUND ART

The ability to determine the distance to objects or surfaces in a three-dimensional spatial scene is becoming increasingly important in many fields, such as computer graphics, virtual and augmented reality, robot navigation, manufacturing, object shape recognition, and medical diagnostics. A large variety of non-contact techniques have been developed to obtain range images, two-dimensional arrays of numbers that represent the distance or depth from the imaging instrument to the imaged object. A range image measures the location of each point on an object's surface in three-dimensional space. Active range scanning methods include time-of-flight, depth from defocus, and projected-light triangulation. Triangulation-based methods, such as structured light range scanning, are applicable to a wider range of scene scales and have lower hardware costs than other active methods.

Devices that obtain range images by triangulation methods are known as range scanners. A typical prior art structured light range scanning system 10 is illustrated in FIG. 1. A light projector 12 projects a plane of light 14 onto a three-dimensional object 16 to be imaged, creating a narrow stripe. The image of each illuminated point of object 16 is detected by a camera 18 at a particular two-dimensional location on the camera image plane 20. The intersection of the known illumination plane 14 with a camera line of sight uniquely determines a point on the object surface. Provided that the relative geometry of the camera and projector is accurately known, the three-dimensional locations of surface points of object 16 can be determined through triangulation. Obtaining a range image of the entire scene requires scanning of the light plane 14 in time, a relatively time-consuming process, and currently not feasible for moving scenes or real-time data acquisition.

In order to speed up the imaging process and eliminate mechanical scanning, two-dimensional projected light patterns have been used. Rather than a single plane, a number of distinct planes are projected onto the scene; the image obtained therefore contains range information for the entire scene, and not just a small slice of it. Such illumination patterns introduce a new problem: identifying correspondences between image positions and pattern positions. When only a single light plane is projected, an illuminated part of the image must correspond to the projected plane. If a number of planes are projected, however, a camera pixel receiving light originating from the projector may correspond to any one of the projected planes, and it is necessary to determine the responsible plane.

Highly reliable identification of light planes with minimal assumptions about the nature of the scene can be achieved by time multiplexing, i.e., by sequentially projecting several different illumination patterns. The sequence of intensity values received at each camera pixel defines a unique code that identifies a location of the projection pattern, therefore allowing triangulation to be performed. Range data can be computed after the full sequence of projection patterns has been captured by the camera. A large number of pattern systems have been developed for a variety of scene constraints, each one having different advantages applicable to different types of scenes. Two constraints applicable to static scenes are the surface continuity and reflectivity of the scene. A surface reflectivity assumption refers to the similarity of reflectivity of adjacent surface regions in the scene. If the scene is of uniform color, then it is much easier to obtain information from the reflected intensities. Spatially varying reflectivities require different decision thresholds for different pixels of the detector. For example, consider a pattern that contains three different projected light intensities. The same projected intensity results in different reflected and imaged intensities when reflected from different scene locations, and a decision about the detected intensity level requires at least some knowledge of the reflectivity of the corresponding scene surface. Similar considerations apply to the surface continuity of a scene. Scenes with high surface continuity, i.e., smoothly changing surfaces, such as human forms, allow correlation of pattern features across large distances. Low-surface-continuity scenes, however, require that codes be ascertained from nearby pixels, without requiring information from far-away detector pixels.

One well-known system of time-modulated illumination patterns uses binary Gray codes, projecting a series of stripes that decrease in width in sequential patterns. An early use of Gray codes is described in K. Sato and S. Inokuchi, "Three-Dimensional Surface Measurement by Space Encoding Range Imaging," *J. Robotic Systems*, 2, 27–39, 1985, and a large number of variations are available in the art. A sequence of Gray coded patterns, each projected at a particular time $t_i$, is shown in FIG. 2. Each pattern can be thought of as a bit plane for a Gray code, considering a shaded stripe as a 0 bit and a white stripe as a 1 bit. For example, the scene surface that receives light at the location marked with the center of an X sees the bit code 1 1 1 0 1. As long as the scene does not move, a particular camera pixel (or multiple pixels) receives light reflected from this particular scene surface over the duration of the projection sequence, and the detected 1 1 1 0 1 code is used to determine the projector location corresponding to this camera pixel. The number of patterns needed is determined by the desired resolution, which may itself be determined by the camera or projector. For a maximum of N distinguishable horizontal positions, a Gray coded pattern requires $\log_2 N$ patterns.

Structured light patterns based on Gray codes are very robust and widely used. They require virtually no assumptions about the scene reflectivity or surface continuity. Correspondences are determined using only single-pixel information, and pixel thresholds can be determined initially by projecting all-dark and all-bright patterns. However, a relatively large number of patterns is needed, demanding that the scene remain static for the duration of the pattern sequence. Thus if real-time range data is needed, or moving scenes are imaged, a different pattern system is required.

One approach for imaging moving scenes is to use a "one-shot" system of projection patterns. A single pattern is continually projected, and range information is obtained for each camera image. Provided that the scene movement is not so rapid as to cause motion blur in the captured images, one-shot systems can be used to obtain range data for moving scenes. The drawback of one-shot systems is that they are limited to scenes having relatively constant reflectivity and a high amount of continuity. For example, color projector patterns have been used in which each projector pixel transmits light with a distinct ratio among the red, green, and blue (RGB) or hue, saturation, and intensity (HSI) color components. The detected RGB or HSI value at each camera pixel determines the correspondence between the camera pixel location and projector pixel location. In a different system, the pattern consists of a continual fade from black to white, with detected gray-scale intensity values used to determine the responsible projector pixels. Both of these patterns require a relatively constant and known reflectivity for all locations within the scene. An alternative one-shot system projects a repetitive pattern such as a grid. An example of such a method is described in M. Proesmans et al., "One-Shot Active 3D Shape Acquisition," *Proceedings of the International Conference on Pattern Recognition,* 336–340, 1996. Assuming a relatively smooth scene surface, distortions of the grid angles and lines on a global scale are used to determine correspondences. However, the projected grid must remain connected in the image of the illuminated scene in order to allow accurate correspondences to be determined.

There is still a need, therefore, for a triangulation-based structured light range scanner that can obtain real-time image data of moving scenes without assuming global surface continuity or uniform reflectivity of the scene.

OBJECTS AND ADVANTAGES

Accordingly, it is a primary object of the present invention to provide a range scanning method that produces real-time range images of moving scenes.

It is a further object of the invention to provide a range scanning method that uses a minimal number of projection patterns while making only local assumptions about the continuity or reflectivity of a scene surface.

It is an additional object of the invention to provide a range scanning method for generating complete three-dimensional models of rigid objects.

It is another object of the present invention to provide a range scanning method that uses commercially-available, inexpensive hardware.

It is a further object of the invention to provide a range scanning method that can be adapted to a wide variety of scene constraints and computational requirements.

It is to be understood that not all embodiments of the present invention accomplish all of the above objects.

SUMMARY

These objects and advantages are attained by a method for real-time range scanning of a scene, possibly moving, containing the following steps: projecting a sequence of N radiation patterns onto a scene; capturing a current image of the scene with an image detector; identifying features of the current image with matching features in a distinct image, for example, the previous image; determining fixed projection positions within the radiation pattern that correspond to current image features; and computing a range for each current image feature by geometrical analysis, such as triangulation, based on the corresponding fixed projection position. The method may also include a step of estimating a spatially varying surface reflectivity of the scene.

Each radiation pattern contains a set of pattern features at fixed projection positions. The sequence of N matching pattern features at each fixed projection position defines a code, which is preferably unique and permits identification of the image feature with its corresponding projection position. In the current image, the position of each image feature may be different from the position of its matching image feature in the distinct image, because at least part of the scene may have moved between the distinct and current images. Preferably, the distance between matching image features in sequential images is below a threshold distance. The code for each image feature is determined from the current image and differently-timed images, preferably images corresponding to the N−1 preceding or succeeding patterns, and is used in determining corresponding projection positions.

The radiation used to generate the patterns may be electromagnetic radiation, such as visible light, infrared light, or x-ray radiation, in which case feature values may be light intensity values or RGB values. Features are preferably uniformly spaced in the projection pattern, with the spacing in part determined by a resolution of the image detector. The value of N is preferably the minimum number of patterns required to provide unique codes, given a specific number of features. The patterns may be selected in part in dependence on a computational efficiency of the various computation steps of the method. In one embodiment, the pattern features are stripe boundaries.

While the method is particularly advantageous for moving scenes, it can also be used for static scenes. In this case, the position of matching image features does not move between images. The pattern consists of a set of parallel stripes defining projected stripe boundaries that are identified by stripe values on each side of the boundary. A sequence of N stripe boundaries defines a code, preferably unique, for each fixed projection position. Preferably, the stripe boundaries are uniformly spaced, as determined by a resolution of the detector or projector.

The present invention also provides a system of implementing the above methods containing a radiation projector for projecting the patterns, an image detector for capturing the images, and a data processor for performing computations to obtain a range image for each captured image.

Also provided is a program storage device accessible by a computer in communication with an image detector. The program storage device tangibly embodies a program of instructions executable by the computer to perform the method steps discussed above for real-time range scanning of moving scenes.

DETAILED DESCRIPTION

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

The present invention provides a method for real-time range scanning of moving and static scenes, along with an associated system and computer-accessible program storage device. Range images can be obtained at the rate at which scene images are captured by a detector, e.g., 60 Hz. Because the method makes few assumptions about the nature of the imaged scene, it can be used in a wide variety of applications that would benefit from real-time range data of moving scenes. As used herein, moving scenes include scenes that are inherently moving, i.e., in which objects move relative to one another or themselves deform; inherently static scenes that are made to move, e.g., rotate, with respect to the scanner; and static scenes with respect to which the scanner moves.

Figure 1:
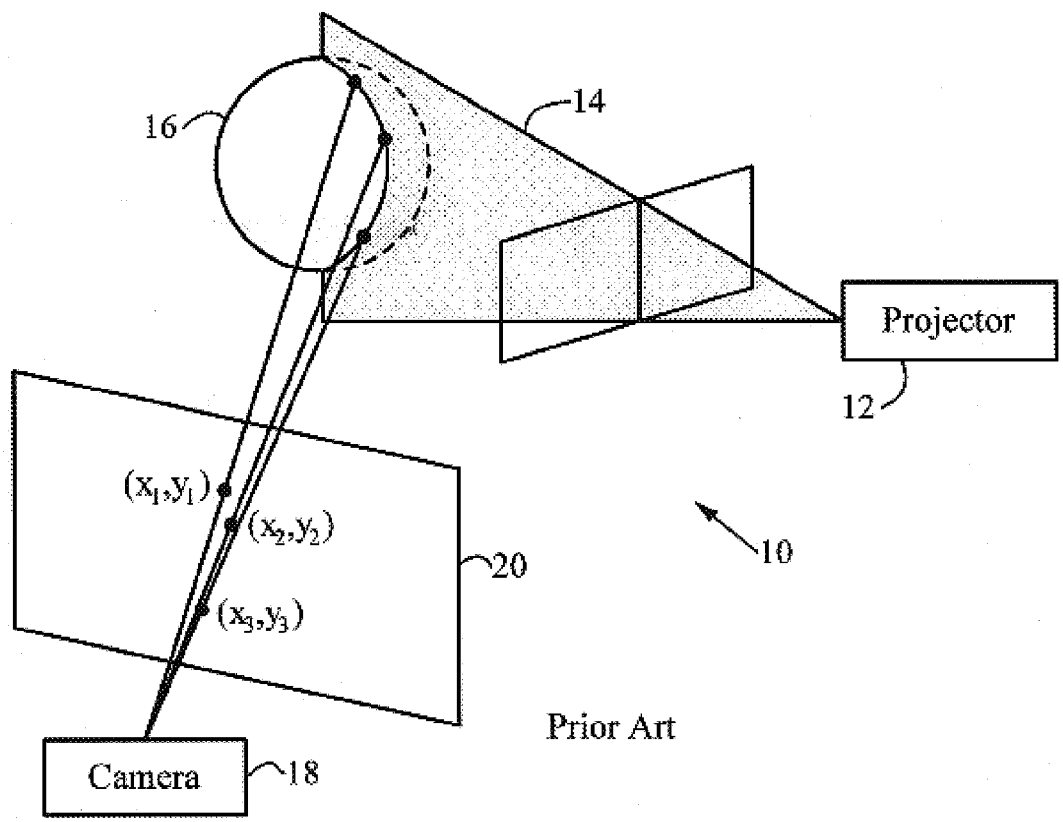
FIG. 1 is a schematic diagram of a structured light range scanner of the prior art.
Figure 2:
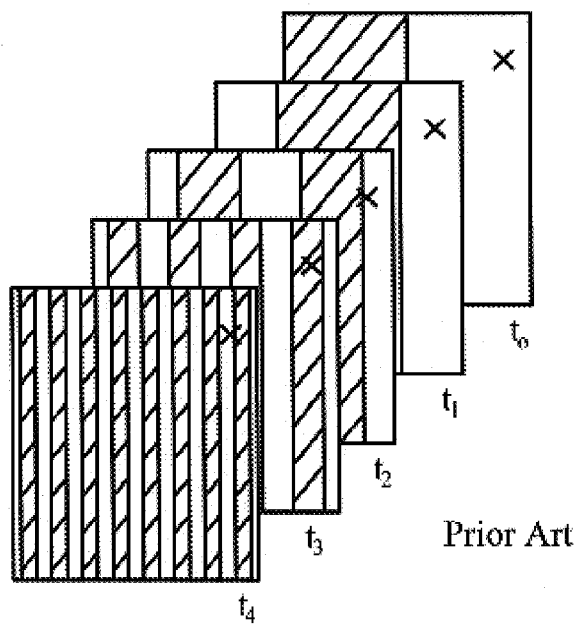
FIG. 2 illustrates prior art illumination patterns based on Gray codes.
Figure 3:
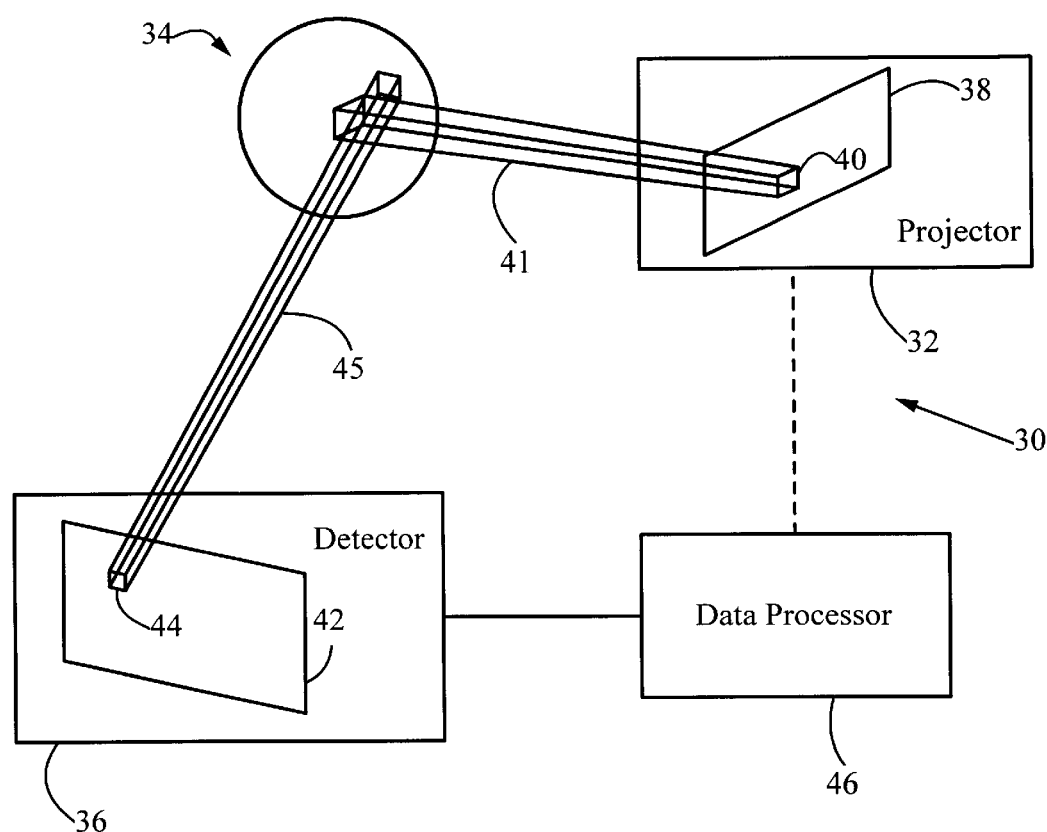
FIG. 3 is a schematic diagram of a system for implementing the present invention.

A system 30 for implementing a method of the present invention is illustrated schematically in FIG. 3. A projector 32 projects a radiation pattern onto a scene 34. The radiation reflects on one or more surfaces of scene 34, and is received at an image detector 36. The radiation image captured by the detector is analyzed to determine correspondences between positions of the camera image and positions of the original projected pattern. Once the correspondences are determined, the distance between detector 36 and points on the scene surface can be computed to generate a range image. Positions within the camera image and within the original projected pattern are defined within a two-dimensional coordinate system. A discretized system is assumed for the present invention; however, a spatially continuous transmission or detection of light is easily modeled using discrete assumptions without significantly affecting the accuracy of the resulting range image. The radiation pattern generated by projector 32 can be considered to originate from a grid 38 of square or rectangular projector pixels 40. The number, geometry, and position of projector pixels 40 is hardware-dependent and known in advance. In principle, each projector pixel 40 is able to transmit radiation having a particular value of some known quantity (e.g., intensity), averaged over the area of the projector pixel and the transmission time of a single pattern. The collection of values assigned to each projector pixel determines an overall radiation pattern. Radiation projected from pixel 40 travels a known path, illustrated as a straight-line path in FIG. 3, toward scene 34 to define a volume 41. It is assumed that volume 41 is relatively well contained, so that it intersects only pixel volumes originating from neighboring pixels.

Image detector 36 receives reflected radiation onto an image plane 42 that contains a grid of square or rectangular detector pixels 44. Each detector pixel 44 reports a discretized average value of the same known quantity that defines the radiation pattern. The average is both spatial, over the area of the pixel, and temporal, over the time during which a single image is obtained. As with projector pixel 40, radiation collected by pixel 44 comes from a volume 45 extending out from image plane 42. Radiation arriving at pixel 44 originates from projector pixels whose volumes intersect volume 45. Under the epipolar constraint, it is assumed that a limited number of projector pixel volumes can intersect each camera pixel volume.

Reported values from each detector pixel are transferred to a data processor 46, such as a computer or multiple computers within a distributed computer system. Data processor 46 computes the correspondences between positions within image plane 44 and projector plane 38 and uses the correspondences to obtain a range image of scene 34. The three components of system 30—projector 32, image detector 36, and data processor 46—may be commercially available devices, or they may be constructed explicitly for implementing the present invention. Data processor 46 implements aspects of the method under instruction from program code of the present invention that is typically stored in a memory or other suitable storage device of data processor 46. Developing a computer program to implement the present invention will be apparent to one of average skill in the art of computer programming upon reading this description. The program code can be in any suitable programming language.

Data processor 46 can also control projector 32 to project each radiation pattern at a specific time. In particular, data processor 46 may synchronize the beginning of and duration of each image capture and pattern projection. Alternatively, projection timing and pattern content can be controlled by a separate projector controller. Data processor 46 need only know eventually which radiation pattern is responsible for each image. Provided that it knows the timing of the beginning of the projection sequence, projection timing can be controlled sufficiently accurately by projector controller hardware.

Any type of radiation for which values of a known property can be assigned spatially may be used in the embodiments of the present invention. For example, the radiation can be electrons. Different types of radiation are suitable for different scene characteristics or application requirements. For example, ultrasonic radiation may be useful in non-intrusive medical applications or underwater applications. The chosen radiation determines the projector and image detector used, and may place additional constraints on the scene. More specifically, the radiation can be any type of electromagnetic radiation, including, but not limited to, γ-rays, x-rays, ultraviolet, or infrared light, or radio waves. The remainder of the system and method will be described below with reference to visible light. However, it will be apparent to one of average skill in the art, upon reading this description, how to extend the method to different wavelengths of electromagnetic radiation or to other types of radiation.

When the invention is implemented using visible light wavelengths, projector 32 can be a commercially available slide projector, LCD projector, Digital Light Processing™- based projector, or other suitable light projector. The quantity whose value is controlled to create a projection pattern can be light intensity or, for a color projector, relative values of red, green, and blue (RGB) components. The essential components of the light projector are a light source, focussing optics, and a mask device that spatially limits light transmission according to a rapidly changing pattern, and therefore projector 32 can be constructed very simply and inexpensively from available components, instead of being a commercial device. For visible wavelengths, image detector 36 can be a CCD (charge coupled device) video camera, a CMOS (complementary metal oxide semiconductor) imager, or any other suitable visible light image detector that captures images at a known frame rate. For example, a standard NTSC (National Television System Committee) video camera captures images at 60 Hz. These cameras and light projectors can communicate with data processor 46 using standard interfaces.

Although the invention is not limited to any particular data processor, data processor 46 is typically a computer that includes a processor, memory, and I/O devices. Specific implementation details of the present invention are in part determined by the speed of the computer processor. If it is desired to obtain real-time range images of moving scenes, then the processor must be able to process data obtained from the camera at the rate at which images are obtained. The currently preferred embodiment of the invention provides such functionality. However, it is anticipated that as processor speeds increase, further computations may be performed while still returning real-time image data. These further computations will permit even more assumptions about the nature of the scene to be eliminated.

An important contribution of the present invention is a novel system of projection patterns that permit real-time computation of range images for moving scenes. The key to these patterns is that they contain high-density, matching features that can be tracked from image to image, even as the location within the image of the matching features changes. While a range scanning method using this system requires a sequence of distinct projection patterns, range images are obtained from every camera image; for a standard NTSC camera, range images are obtained at 60 Hz.

Figure 4:
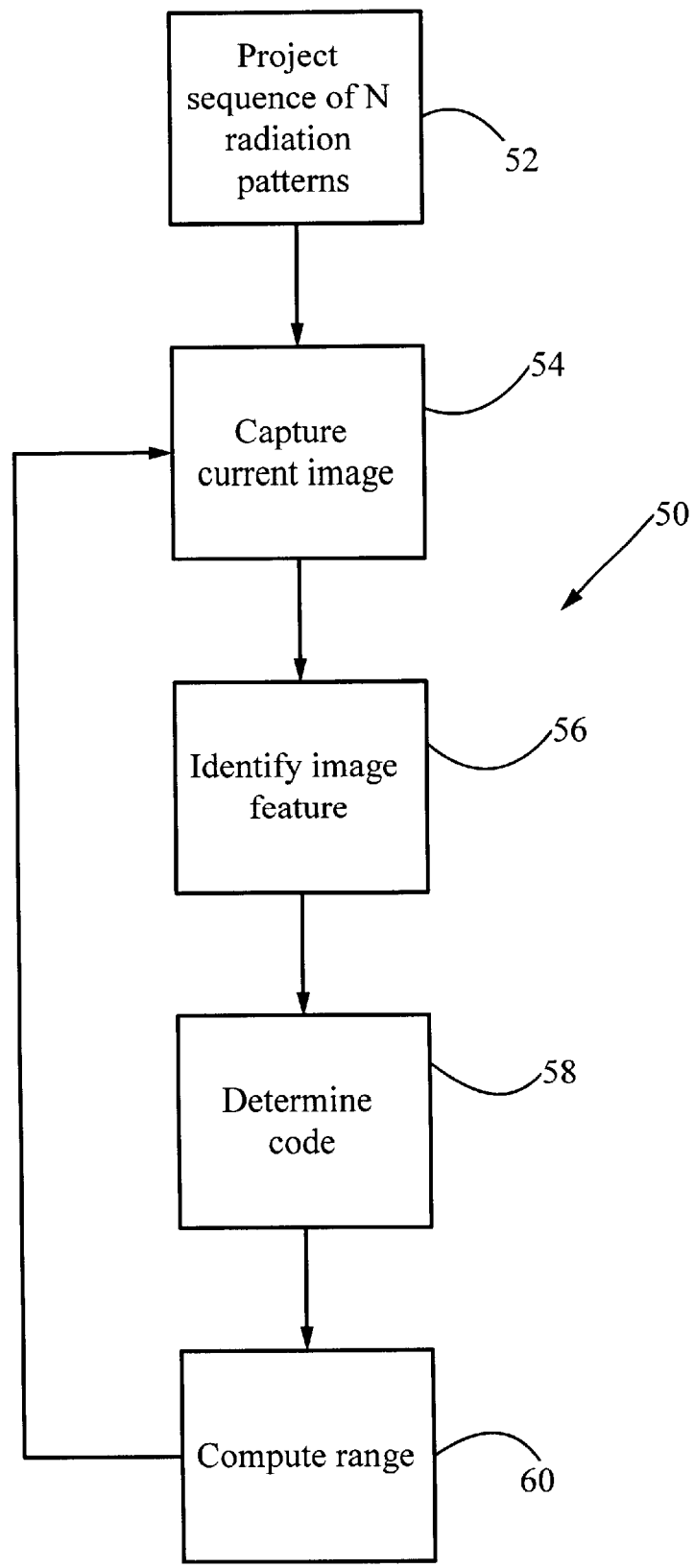
FIG. 4 is a flow diagram of a range scanning method of the present invention.

A flow diagram of a method 50 of the present invention for real-time range scanning of a moving scene is shown in FIG. 4. In general, while the overall conceptual flow of the method is as shown, individual steps of the method are not necessarily performed in the precise order shown. Furthermore, different computational steps of the method can be performed in different computers within a distributed system to optimize the efficiency of the method. In step 52, a sequence of N distinct radiation patterns is projected onto the scene. Each pattern is characterized by a set of pattern features at fixed locations, called projection positions, that are preferably uniformly spaced (in at least one dimension) and at a density commensurate with the desired or allowable resolution of the projector or detector. Such patterns are termed dense, because they provide high-resolution information, as opposed to patterns such as Gray codes that contain large areas of constant value. The N features that appear at each projector position over the sequence of patterns are known as matching features. Matching features are related only by virtue of their appearing at the same projection position. They can have the same appearance or different appearances, as defined by the radiation quality of interest (e.g., light intensity). Over the entire sequence of N patterns, each projection position has a sequence of matching features that defines a code, which is preferably unique to each projection position. However, the code may not be unique, but in combination with other factors, may uniquely identify the projection position. For example, each projection position can be a three-pixel area of the pattern, each matching feature can be an intensity value of the three pixels, and each code can be an N-sequence string of three-pixel intensity values.

In step 54, a detector image of the illuminated scene is captured. The detector image contains a set of image features that correspond to the pattern features. In general, the number of image features is less than or equal to the number of pattern features, because each pattern feature may not appear in the image. If possible, each feature in the detector image is then identified with its matching feature appearing in a distinct image, preferably the directly previous image (step 56). For example, a feature in a current image is identified with a matching feature in a previous image if the two features are located within a threshold distance from one another. In some cases, a matching feature does not appear in the distinct image, e.g., if it is in a shadow in the distinct image. For this reason, it is said that a first subset of current image features is identified with matching image features. The first subset includes all current image features whose matching features appear in the distinct image; it therefore contains some or all of the current image features. The first subset does not contain image features whose matching features do not appear in the distinct image or that otherwise cannot be identified. In general, a large number of the current image features can be identified with their matching features. The positions of matching features are fixed in the projection patterns; however, for a moving scene, the image position of at least one matching feature differs in subsequent images, because the depth of the scene surface reflecting radiation from a particular projection position changes as the scene moves. The ability to identify matching image features that are defined in part by their position in the projector pattern, but that differ in position in images, is an essential feature of the present invention. This ability is known as tracking features.

In step 58, which may occur after or concurrently with step 56, the code for each of a second subset of currently observed image feature is determined. The second subset includes all or fewer than all currently observed image features. The second subset can be the same as or a subset of the first subset, or it can contain image features not contained in the first subset. That is, there is no necessary relationship between the first and second subsets. Because the code is defined over the sequence of patterns, step 58 requires comparison of differently-timed images with the current image. For example, in a simplest case, the differently-timed images are images corresponding to the previous N−1 projections of the pattern. The sequence of matching features, which have been identified in previous iterations of step 56, in this set of images defines a code for each feature. As with step 56, it is not always possible to obtain the complete code for each image feature, because some matching image features do not appear in the differently-timed images; the second subset contains all image features for which matching image features appear in the differently-timed images, or for which enough information can be obtained from the differently-timed images to determine a code. After the code is determined, the corresponding projection position can be obtained and the range computed in step 60. The range is computed using a geometric analysis that requires knowledge of the projection and reflection paths of the radiation, as well as the distance and angular orientation between the projector and detector.

For straight line paths without mirrors, the geometric analysis is triangulation. Triangulation methods are described in full detail in the prior art and will not be discussed herein. A different geometric analysis is required when mirrors are used to direct the path of the radiation. The method then returns to step 54 to compute a range image for the next captured image.

Figure 5:
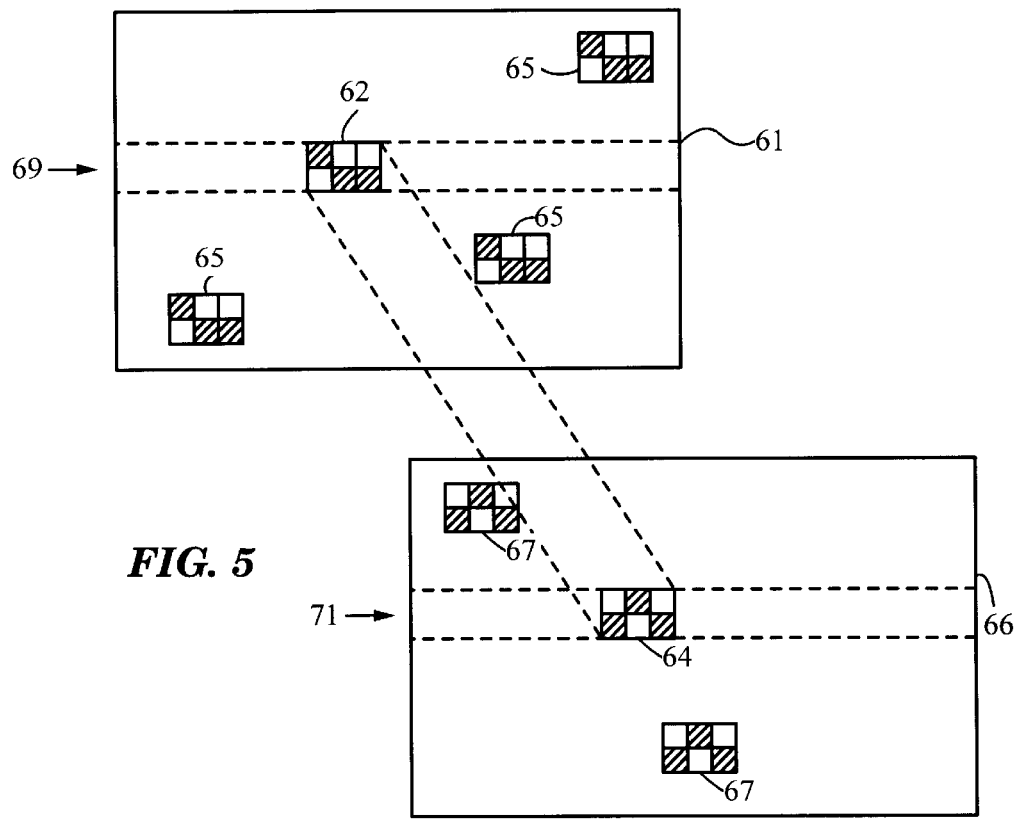
FIG. 5 illustrates sample random dot projection patterns of the present invention.

In theory, the present invention can be implemented using any sequence of projection patterns having high-density features that can be tracked. For example, each pattern can be a random collection of black and white dots, in which each projector pixel is either black or white (i.e., low light intensity or high light intensity). A pattern feature is defined to be a collection of some number of pixels at a given location. Provided that the patterns are known and sufficiently random, the features can be tracked as shown in the example of FIG. 5. Pattern 61 contains a pattern feature 62 that has a matching feature 64 in a previous pattern 66. Tracking the image of feature 62 consists of locating the image of feature 64 in the previous image. In a random pattern, features 62 and 64 are most likely not unique, but preferably occur only a few times, distributed throughout the area of patterns 61 and 66, respectively. There are therefore a number of matching features (not shown) in pattern 66 that match patterns 65, which resemble feature 62, and there are also a number of features 67 in pattern 66 that appear to match feature 62. It is necessary somehow to exclude all such possibilities when searching for feature 64. Tracking feature 62 can be done by limiting the area in the image of pattern 66 over which the search is performed, estimating the velocity of movement between matching features, or any other means. Under the epipolar constraint, only certain projector pixels can be responsible for the radiation received at a single camera pixel; for example, if it is assumed that a given row of camera pixels can be associated only with a corresponding row of projector pixels, then the search for a feature matching feature 62 in row 69 is limited to row 71.

Figure 6:
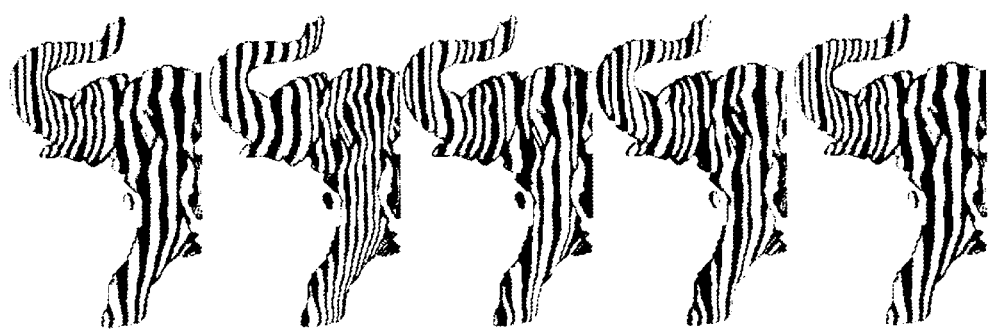
FIG. 6 is a sequence of five images of an elephant figurine onto which sample illumination patterns of the present invention have been projected.

The present invention has been implemented using a novel system of projection patterns known as "two-stripe codes," described in detail below. It is to be understood that two-stripe codes are an example of dense codes containing trackable features, and that the present invention is not limited to two-stripe codes. Furthermore, two-stripe codes apply to all types of radiation; any reference to visible light below is for illustration purposes only. Patterns based on two-stripe codes consist of parallel vertical or horizontal stripes of either full intensity or zero intensity light. The stripe direction is perpendicular to a line between the focal points of the projector and detector; vertical stripes are used for a camera and projector mounted on a common horizontal surface. Full intensity stripes are referred to as white, on, or 1. Zero intensity stripes are referred to as black, off, or 0. An example sequence of five images of an elephant figurine onto which two-stripe coded patterns have been projected is shown in FIG. 6.

Unlike patterns based on Gray codes, in which the code is determined by the pixel intensity within a stripe, the feature of two-stripe coded patterns is the boundary or edge between two stripes. A stripe boundary has four possible values, each referring to the light intensity on either side of the boundary: on-off, off-on, on-on, and off-off. Note that two of these values, on-on and off-off, referred to herein as "ghost" boundaries, are not immediately detectable. However, if the location of the boundary is known or can be estimated, then on-on and off-off values can be determined and are just as informative as are off-on and on-off values, for the purpose of forming correspondences. Note that the term boundary is used for both immediately detectable boundaries (off-on and on-off) and those that are not immediately detectable (off-off and on-on). In fact, the term boundary, as used herein, refers to a border between projector pixels that have independently varying values, i.e., a fixed projection position. One requirement of the pattern sequence is that one of the matching boundaries at each fixed projection position be detectable, i.e., that the position have either an on-off or off-on value in at least one pattern in the sequence of N patterns. Preferably, boundaries have a maximum density determined by the resolution of the detector or projector. The region between boundaries may be a single projector pixel or multiple projector pixels that always project radiation having the same value.

The concepts behind two-stripe codes are easily extended to k-stripe codes, in which stripes have one of k different intensity values, and boundaries have $k^2$ possible values. It will be apparent to one of average skill in the art how to extend the discussion below to k-stripe codes.

Figure 7:
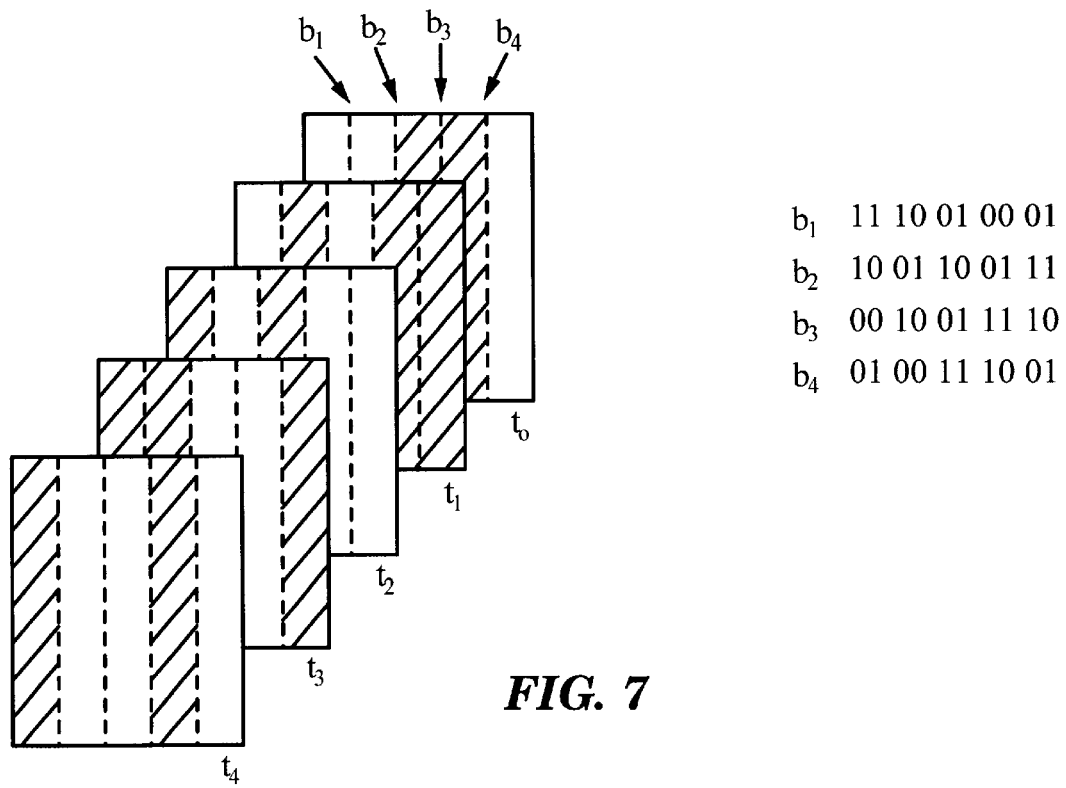
FIG. 7 illustrates projection patterns of the present invention based on two-stripe codes.

A sample sequence of five two-stripe coded patterns projected at times $t_0$ through $t_4$ is shown in FIG. 7. Typical patterns contain hundreds of boundaries; the patterns of FIG. 7 are for illustration purposes only. Each pattern shown has four boundaries at fixed locations or projection positions within the grid of projector pixels, labeled $b_1$, $b_2$, $b_3$, and $b_4$. Corresponding feature values are given in the following table, with 0 corresponding to shaded stripes and 1 corresponding to unshaded stripes:

|       | $b_1$ | $b_2$ | $b_3$ | $b_4$ |
|-------|-------|-------|-------|-------|
| $t_0$ | 1 1   | 1 0   | 0 0   | 0 1   |
| $t_1$ | 1 0   | 0 1   | 1 0   | 0 0   |
| $t_2$ | 0 1   | 1 0   | 0 1   | 1 1   |
| $t_3$ | 0 0   | 0 1   | 1 1   | 1 0   |
| $t_4$ | 0 1   | 1 1   | 1 0   | 0 1   |

The codes are shown in FIG. 7. A code consists of the sequence of features at each projection position over the N patterns. For example, the code for projection position $b_1$ is 00 01 10 11 10. In this example, each projection position has a unique code.

Figure 8:
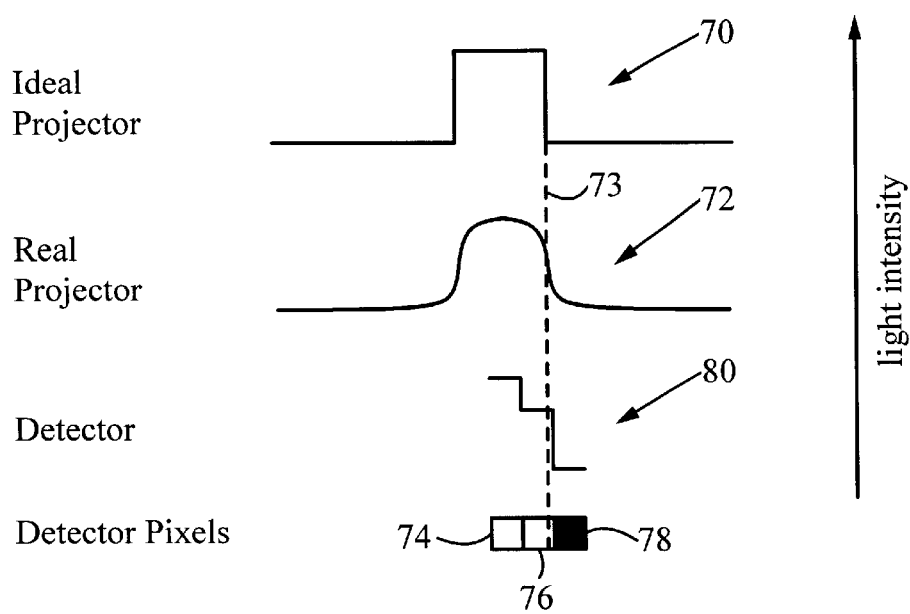
FIG. 8 illustrates projected and detected intensities within an illumination pattern.

Analysis of the signals produced by the image detector consists minimally of detecting the location of stripe boundaries, which determines their on-off values. Intensity detected by the camera pixels is not simply an on or off intensity. In general, as shown in FIG. 8, a pattern 72 projected by a real projector with imperfect focus does not contain perfectly crisp edges, as would an ideal pattern 70. Real pattern 72 is smoothed around a stripe edge at dotted line 73. Furthermore, detector pixels 74, 76, and 78 are not lined up with reflected light from particular projector pixels, nor are they the same size as projector pixels, nor is the detector focus perfect. The detector pixels output intensity values 80 that are spatial and temporal averages of all received light during a single image collection period, and are therefore discrete values that represent a continuous boundary. In FIG. 8, the location of the edge in the image is estimated to be between pixels 74 and 78 or at pixel 76. This boundary is assigned a feature value of on-off because it is a boundary from a bright to dark stripe.

Two-stripe codes of the present invention provide a number of advantages. They require a relatively minimal assumption about surface continuity of the scene, that two horizontally adjacent camera pixels receive light originating from two adjacent projector pixels. Thus the surface continuity required is on the scale of two projector pixels (or group of pixels projecting the same value) and only in the horizontal direction. This requirement is needed to permit identification of boundaries and the intensity values on either side of the boundaries. At each camera image, useful information is obtained at the highest spatial resolution, unlike with patterns based on Gray codes that have large areas of constant intensity. As a result, as described below, fewer patterns are needed to determine correspondences.

One of the requirements of the patterns is that image features can be identified in each camera image or frame. There are three different levels of feature identification to be performed: a full identification, a code identification, and an image-level identification. Depending upon the embodiment of the invention, any or all of the identification levels may be performed simultaneously or sequentially. A full identification determines which particular projection position (i.e., stripe boundary) corresponds to each image feature. A code identification determines the code corresponding to each image feature. The lowest identification level, the image-level identification, identifies an image feature in a current frame with a matching image feature in a distinct frame, preferably the directly previous frame.

In a currently preferred embodiment of the invention, an image-level identification is performed between matching image features in the current image and in the directly previous image. If the scene were static, then image-level identification would be trivial: matching boundaries are at identical image positions (to within noise levels). For a moving scene, a boundary must be identified with a previous matching boundary at a different position. This particular embodiment of the invention relies on a constraint of maximum stripe velocity. A stripe boundary is assumed to move no more than a threshold distance from its matching boundary in a subsequent image. For example, a threshold distance may be defined as one-quarter the distance between a stripe boundary in a current image and its nearest neighbor (i.e., a stripe width). Image-level identification then consists of locating the stripe boundary in a previous image that is within the threshold distance from the current stripe boundary, and assuming that the two boundaries are matching boundaries, i.e., originate from the same projection position.

Figure 9A:
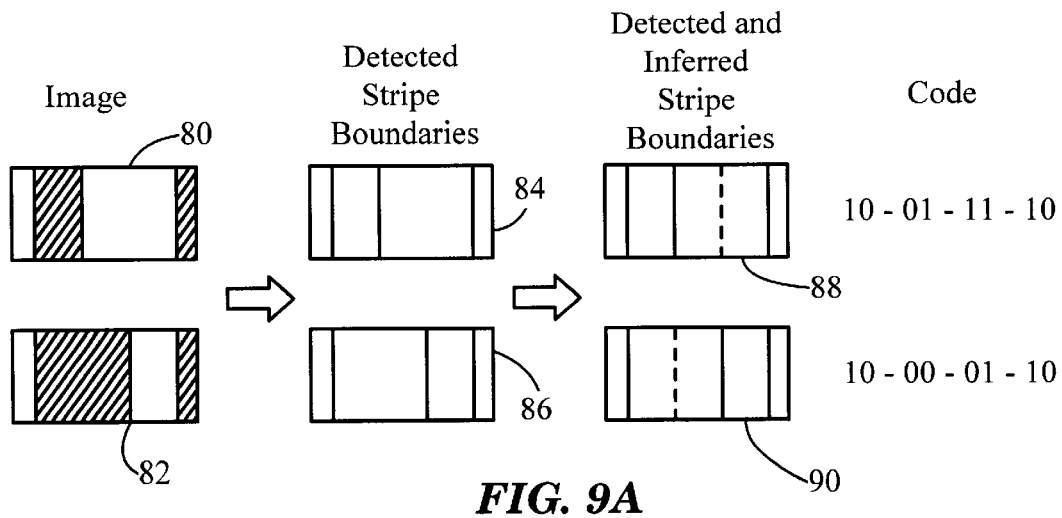
FIGS. 9A–9B illustrate the detection, matching, and decoding of stripe boundaries for static and moving scenes, respectively.
Figure 9B:
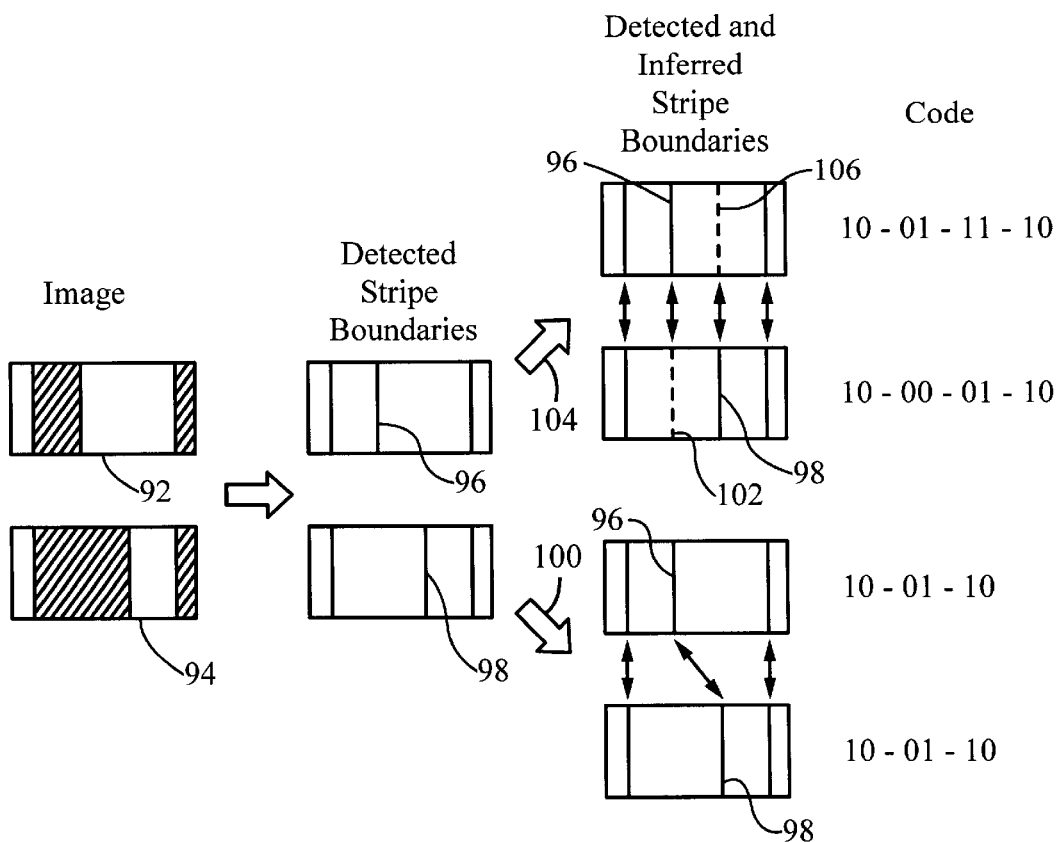

The maximum stripe velocity constraint is used to determine the presence of ghost boundaries. The problem addressed is illustrated in FIGS. 9A and 9B. FIG. 9A shows excerpts of two successive pattern images 80 and 82 of a static scene. Three stripe edges are detected in each image, shown in detected stripe boundary frames 84 and 86. Because matching stripe edges are at the same location in successive images, their image-level identities are known immediately. Each stripe edge must correspond to a matching stripe edge in the identical position in the previous image, and can be identified as shown in the complete stripe boundaries 88 and 90. Dotted lines represent inferred ghost boundaries. The presence of ghost boundaries can be inferred with complete confidence, and the codes are identified as shown.

Image-level feature identification is substantially more difficult for moving scenes, as shown in FIG. 9B. Image patterns 92 and 94 are detected when the scene is illuminated with two sequential projection patterns. In this case, there are two possibilities for identifying a detected boundary 96. Boundary 96 corresponds either to boundary 98, as shown in option 100, or to a ghost boundary 102, as shown in option 104. In option 104, boundary 98 must correspond to a ghost boundary 106. In order for boundaries 96 and 98 to be identified as matching in option 100, the difference in position must be less than the threshold distance. If the difference is greater than the threshold distance, it is assumed that boundaries 96 and 98 each match a ghost boundary, and the codes are as shown.

After each stripe boundary of the current image has been identified with a previous (or otherwise distinct) matching boundary, codes can be determined. Preferably, a code is determined by obtaining the value of each matching boundary over the previous images corresponding to the previous N−1 pattern projections. If patterns are projected at the same rate as images are captured, then only the previous N−1 images must be examined. If, however, patterns are projected at a slower rate, e.g., 30 Hz, than images are captured, e.g., 60 Hz, then more images must be stored and examined. Of course, projecting patterns more frequently than images are captured is not useful. Depending upon the value of N and the relative rates of pattern projection and image capture, a predetermined number of images (or representative data) must be stored for the code identification to be performed. As new images are obtained, only the data representing images needed for future computations must be retained in storage.

Codes are preferably unique. If so, determining the code of each image feature also determines the correspondence between the image feature and the projection position of its responsible pattern feature. That is, code identification and full identification are performed simultaneously. As discussed below, requiring unique codes increases the number of projection patterns needed. If codes are not unique, then a smaller number of codes and therefore projection patterns may be used. However, an additional step is needed for full identification of each image feature with its responsible projection position. For example, two current image features having the same code may each be identified with one of two different projection positions. If the two positions are separated by a large distance, then choosing the wrong one results in an obviously incorrect range calculation for that image feature position. Various simple heuristics can be applied to determine which of the two potential solutions is most likely correct, or probabilistic multi-hypothesis techniques known in the art can be used to defer making a decision about correctness until further data is examined.

In an alternative embodiment that is significantly more computationally intensive, the maximum stripe velocity constraint is removed, and the search for a matching feature in a previous image (i.e., the image-level identification) is extended to a larger region or to the entire area of the image. Rather than search for a single matching feature corresponding to each individual feature, the search is for a set of features that match the current set of features. For example, if a current sequence (in space) of features is on-off off-off off-on, and the previous set of matching features is off-off off-on on-off, then a search is made for the matching set over the entire image, or over some restricted area of the image. This embodiment requires that a particular string of feature values occurs only a few times within the entire pattern so that it can be identified. Repeated strings of features are also preferably separated from each other by a large distance. The size of the repeated strings can be selected based on surface continuity assumptions and the number of patterns in the sequence. The pattern must be chosen using different constraints than for the previous embodiment. While this embodiment requires a more strict surface continuity assumption, it places few restrictions on the movement rate of objects within the scene. As will be apparent to those of skill in the art, the search required for this embodiment is in fact easier than typical searches for two-camera correspondence in computer vision. It is expected that such a search may be performed in real time as processing speeds continue to increase.

A large number of variations to the above patterns and identification methods are within the scope of the present invention. For example, if a small time lag is permissible between image capture and generation of range data, feature identification can be made by looking at frames captured at later times, i.e., by looking forward in time. In the above embodiments in which identification is performed by examining previous images, it is not possible to identify features that appear in an image but that did not appear in previous images. This may occur if, for example, an object suddenly becomes disoccluded. The surface of the newly appearing object may reflect parts of the pattern that were previously not within the camera field of view. If identification is made only by looking backward in time, then pattern features reflected by this object cannot be identified. By looking forward in time, the newly appearing image feature can be identified. Note that the required time lag is very short; for a sequence of four patterns in which patterns are projected at half the rate at which images are taken, and if images are taken at 60 Hz, then the time lag is only 7/60 second.

Because there is no inherent preference for either time direction, a particularly advantageous identification method can identify features by looking both forward and backward in time, requiring the total number of stored images to correspond to 2N pattern projections. This permits identification of image features that either first appear or have their final appearance in a current image. For image features that appear in all images, performing identification in both time directions provides for error checking and improves the robustness of the method.

In fact, the method can be used even if a particular feature does not appear in sequential frames, but appears in frames separated by a number of frames. Such identification requires further constraints on the pattern selection and is more computationally expensive. In addition, different assumptions, pattern constraints, and computational methods may be applied to different parts of a scene. For example, a background typically does not move, while different foreground objects in a scene may move quite quickly. For the background, correspondences can be made even if a single image feature does not appear in one image, but appears in previous and subsequent images. If the scene background remains static throughout the imaging process, then the camera itself can move slowly. Background features can be used to determine the camera movement, so that accurate depth measurements of objects moving more quickly than the camera can be made. Of course, such decisions require some knowledge about the scene characteristics.

Improved accuracy can be obtained by using sub-pixel estimation. Referring again to FIG. 8, pixel 76 generates an intensity value that is greater than half of the value corresponding to full intensity. If it is assumed that surface reflectivity varies slowly, it can be inferred that the actual boundary corresponds to a location between the centers of camera pixels 76 and 78. A simple linear interpolation of the camera pixel intensity values determines a location just at the right edge of camera pixel 76. This location is used for the triangulation. Sub-pixel estimation has been shown to significantly improve the accuracy of the method for smooth surfaces. Note that unlike methods based on Gray codes, the present invention obtains depth values corresponding to stripe boundaries, not to stripes themselves. These depths, however, are very accurate, because triangulation is performed with an exact plane (i.e., the stripe boundary), rather than a wedge between planes (i.e., the stripe itself).

Figure 10:
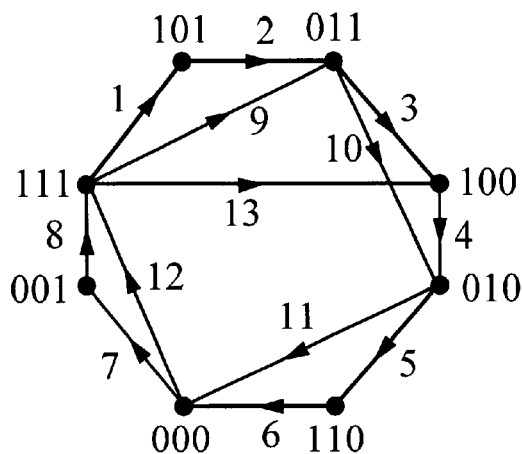
FIG. 10 is a graph and associated codes that represent a sequence of projection patterns.

It is clear from the above discussion that different assumptions, scenes, and computational restrictions place different constraints upon the number and nature of the patterns selected. While it is anticipated that the method will be implemented using empirically selected patterns, the present invention also provides an optional framework or selecting optimal or close to optimal two-stripe coded patterns. The framework, which relies on well-known graph theory, provides a straightforward method for introducing constraints required for each set of patterns. Each projector pixel (or group of pixels that project radiation having the same value) can have one of the allowed intensity (or RGB, etc.) values in each of the N patterns. Each set of single-pixel value assignments over the pattern sequence is represented as a node in a graph. For example, for N=3 and for two-stripe codes, there is one node representing 1 0 1. A sample graph for N=3 is shown in FIG. 10. The total number of nodes is given by $k^N$, where k is the number of possible pixel values; for example, k=2 for black and white patterns. A stripe boundary is represented in the graph by a directed edge between a node representing pixel assignments to the left of the boundary and a node representing pixel assignments to the right of the boundary. Each directed edge represents a unique code. A sequence of illumination patterns is represented by a path in the graph. In FIG. 10, each node is labeled with its projection sequence, and each directed edge is labeled with a number representing its position in the path. That is, the path begins at the node labeled 111, travels along the edge labeled 1 to the node labeled 101, continues along the edge labeled 2, and so on. An illumination pattern is selected by determining the number of required stripe boundaries and then finding a path with the corresponding number of edges. The codes associated with the path traversed in FIG. 10 are shown below the graph.

A variety of constraints can be placed on the selected path. Methods of locating suitable paths subject to applied constraints are known in the art. If unique codes are desired for each stripe boundary position, then an edge of the graph can be traversed at most once, and the task is to locate the longest path with no repeated edges. Another potential constraint, useful for minimizing errors, is to place similar codes far apart in the path. For example, two codes are considered similar if they differ by only one bit, such as 10 11 01 and 11 11 01. For a series of values of N, the number of projection patterns, the longest paths or approximations to the longest paths satisfying the above constraints can be found. The number of required projection patterns can then be selected by determining the number of boundaries required, and choosing a graph for the N whose longest path contains approximately that number of directed edges. The result is that the minimum number of patterns needed to provide unique codes at the desired resolution is selected. For example, for a camera with approximately 640 pixels per row, with four pixels needed to detect a stripe edge, the number of stripe boundaries that can be resolved is approximately 160. A path of length approximately 160 requires four patterns. There are typically a large number of paths having the same length, and projection patterns corresponding to any one of these paths can be used. Note that if the projector has a larger number of pixels per row than the number of stripes desired, then pixels are grouped together and take the same value in all patterns. Clearly, a larger number of projection patterns is needed to provide unique codes for a larger number of stripe boundaries.

In the above-mentioned approach to matching using a maximum stripe velocity constraint, further constraints are needed on the possible projector patterns. In one possible implementation of the maximum stripe velocity constraint, the presence of ghost boundaries must be limited in both space and time. In space, ghost boundaries cannot be adjacent. In time, matching boundaries cannot be ghosts in two successive frames. This means that the "disappearance" of odd-numbered boundaries alternates in sequential patterns with the disappearance of even-numbered boundaries. On the graph, edges corresponding to non-disappearing boundaries are colored black, edges corresponding to boundaries that disappear only in odd-numbered patterns are colored red, and edges corresponding to boundaries that disappear only in even-numbered patterns are colored green. An edge corresponding to a boundary that disappears in both odd and even patterns is removed. A suitable path contains alternating red and green boundaries, with black edges substituting for either one. Selecting a projection sequence consists of locating a path meeting these constraints that has the required number of edges. Two-stripe codes satisfying these constraints are termed "thin" codes, because they appear as a set of thin stripes.

Figure 11:
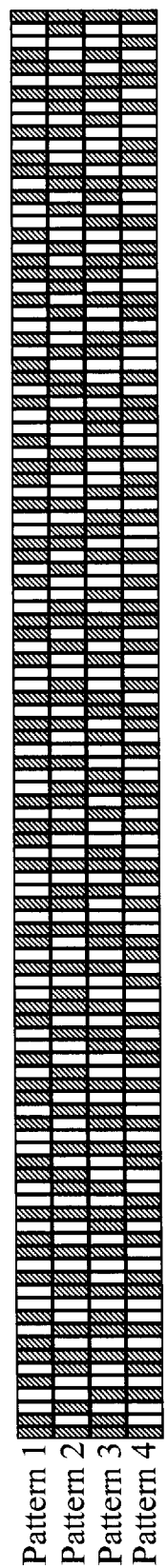
FIG. 11 shows an example of a sequence of projection patterns of the present invention.

FIG. 11 is an example of a realistic set of patterns based on two-stripe codes incorporating the maximum stripe velocity constraint, shown as shaded and unshaded stripes, for which 0 represents a dark stripe (off) and 1 represents a light stripe (on). Each pattern contains 110 stripe boundaries, and each projection position has a unique code over the entire sequence. The particular pattern shown was used to obtain 200×200 pixel range images using a DLP™-based projector and a CCD camera; it was assumed that four pixels were needed to detect a stripe boundary. FIG. 11 illustrates only one of a large number of possible patterns that satisfy the applicable constraints.

The patterns of the present invention may also be applied to static images, and in general require fewer frames than patterns based on Gray codes that provide the same resolution. As with codes for moving patterns, only local surface continuity assumptions, i.e., on the scale of a few pixels, must be made. No surface reflectivity assumptions are required. For static patterns, the maximum stripe velocity constraint does not apply, and ghost boundaries may appear sequentially in both time and space. The one constraint retained is that a boundary at each projection position be detectable at least once in the pattern sequence. There are therefore a larger number of potential patterns for static scenes, and fewer patterns are needed for the same resolution. Static scenes can also take advantage of self-normalizing codes, in which each projector pixel is on at least once and off at least once during the sequence. Self-normalizing codes allow a determination of pixel threshold levels for every camera pixel. They also provide information about the reflectivity of pixel-scale surface regions, whether the projector light reaches each surface region, and the influence of ambient light. If self-normalizing codes are used, then two nodes must be removed from the graph, corresponding to all on and all off pixels.

Note that self-normalizing codes are not feasible for moving scenes, because the reflectivity at each camera pixel changes as the scene moves. One solution to this problem is to track pixel threshold estimates by linking them to the moving object. This approach is not very robust, because errors in propagating thresholds from one image to the next tend to propagate, increasing the number of incorrectly estimated pixel thresholds. An alternative approach is to assume that strong gradients in image intensities correspond to stripe boundaries. This approach makes no assumption about the colors in the scene, but is less stable when the scene contains objects with strong surface textures. Any suitable method for estimating surface reflectivity may be incorporated into the present invention, such as that shown in FIG. 14 and described below.

One particularly useful application of the method is for imaging rigid objects that are not inherently moving, but that are rotated to expose their entire surface area, or, alternatively, around which the scanner is moved, thereby generating a moving scene. By rotating a rigid object during imaging, a full three-dimensional model can be made of the object very rapidly, rather than just a range image. The key feature enabling this application is that successive range images of a rigid object moving at modest speeds are quite close together, as long as data is gathered continuously. Consecutive range images can be aligned with one another, essentially recovering the relative motion of the object and the range scanner. Tools for combining successive images are available in the art; one potential algorithm is iterated closest points (ICP). ICP locates a sample in a range map that corresponds to a given sample in a different range map, and applies a rigid-body transformation that minimizes the distances between corresponding sample points. The algorithm is iterated until convergence. If there are a large number of local minima, which is almost always the case, ICP tends to produce incorrect solutions unless a good initial estimate of the relative alignment is available. However, with the present invention, because successive range images are obtained very close in time, the relative transformation between any two consecutive range images is very small. Frame-to-frame ICP can therefore be performed fully automatically, with little danger of mistake unless the scanned object moves completely out of view. After the frames are aligned, they can be merged using a technique such as the Volumetric Range Image Processor (VRIP) algorithm that integrates multiple range images into a single triangle mesh representing the entire object. VRIP is described in B. Curless and M. Levoy, "A Volumetric Method for Building Complex Models from Range Images," *Proceedings of SIGGRAPH* 96, Computer Graphics Proceedings, Annual Conference Series, 303–312 (August 1996, New Orleans, La.), Addison Wesley, ed. H. Rushmeier. The merged model can subsequently be used for real-time tracking of an object by aligning each range image with the merged model using the same ICP technique.

Figure 12A:
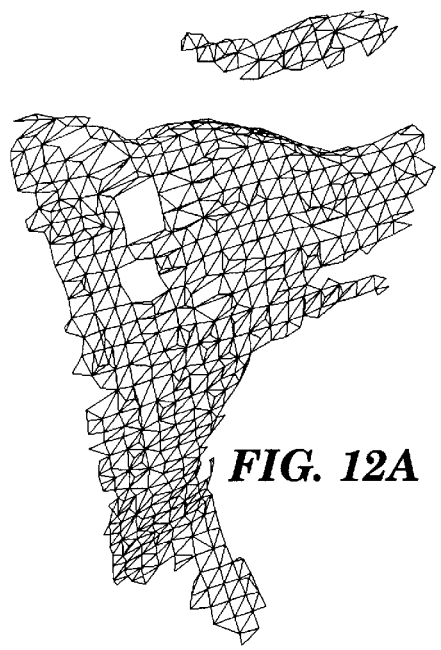
FIGS. 12A and 12B are triangle meshes of two single range images obtained using the present invention.
Figure 12B:
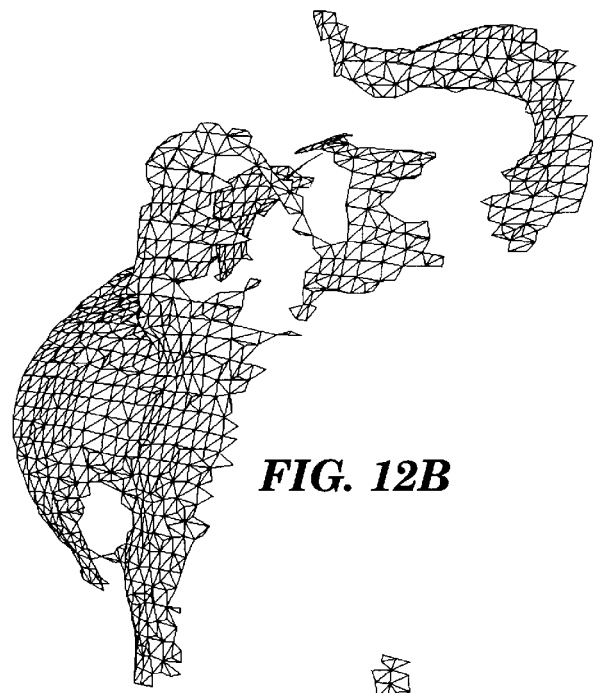
Figure 12C:
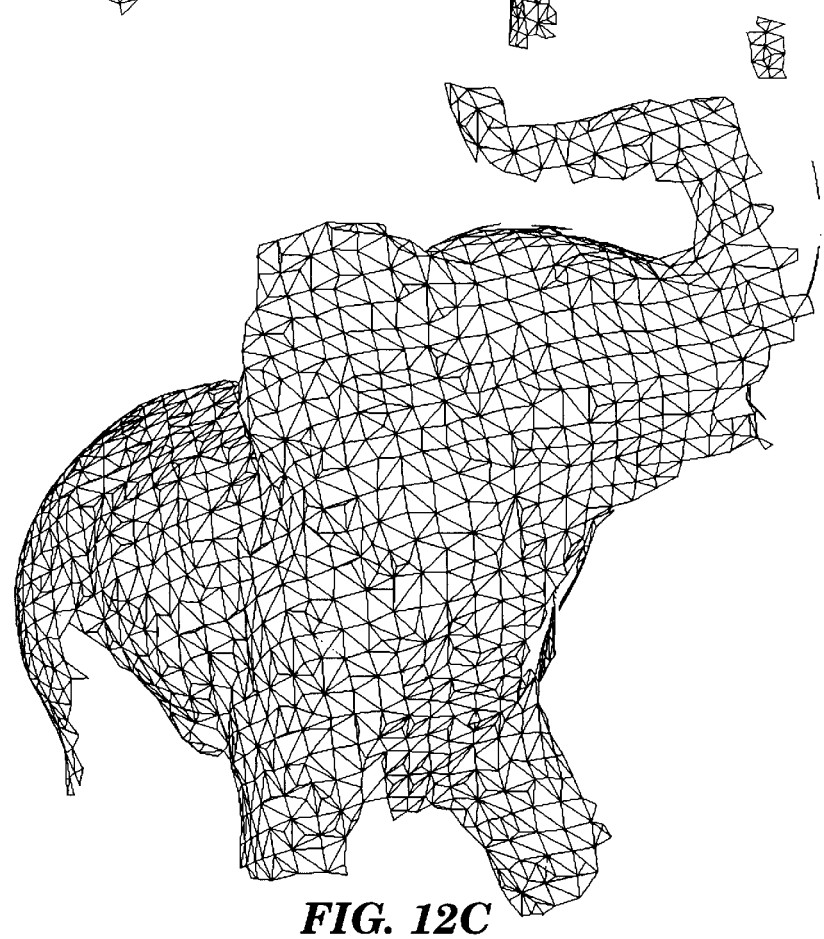
FIG. 12C is a merged triangle mesh created from 159 individual range images, including the images of FIGS. 12A and 12B.

This technique has been shown to produce very high quality three-dimensional models in seconds, and is anticipated to be an important application of the present invention. FIGS. 12A–12C are single range images of the elephant figurine, shown as triangle meshes generated from the computed range data. In FIGS. 12A and 12B, the resolution has been decreased by a factor of two from the actual data for clarity of presentation. FIG. 12C is a merged mesh generated from 159 range images using the VRIP method. The 159 images were obtained by selecting every fifth frame from a sequence of 800 range images, acquired over the course of 13 seconds. The resolution of FIG. 12C has been reduced by approximately a factor of four for clarity of presentation. Because the present invention provides such an enormous amount of range data at very small time intervals, existing algorithms for aligning and merging range images are much more robust than is needed. Newer, less computationally intensive algorithms may be developed in order to integrate range data generated by the present invention.

It is expected that the present invention will open up entire new fields of application, because it provides range images of moving objects at real-time rates, using relatively inexpensive hardware components. Using a standard camera, sixty complete range images can be obtained each second. Range images can be obtained over a large range of length scales. Any application that would benefit from moving range data is likely to benefit from incorporating the present invention. One important application is robot or vehicle navigation, in which the robot or vehicle contains a projector, camera, and processor and can determine almost instantaneously its position in relation to its environment. Other expected fields and applications include:

Artistic: documentation of artwork, small-scale reproduction

Figure 13:
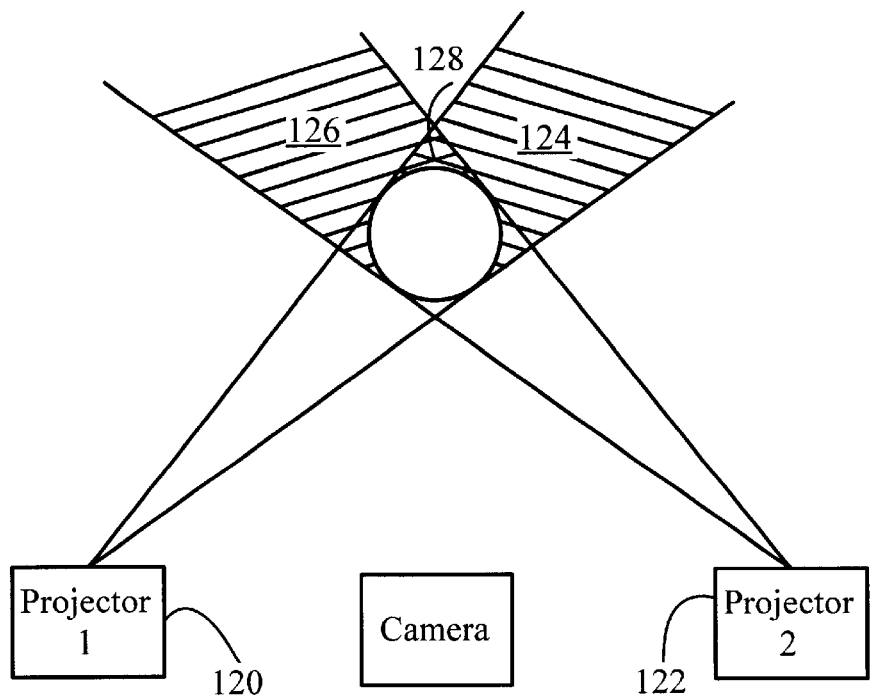
FIG. 13 is a schematic diagram of a two-projector structured light range scanner.
Figure 14:
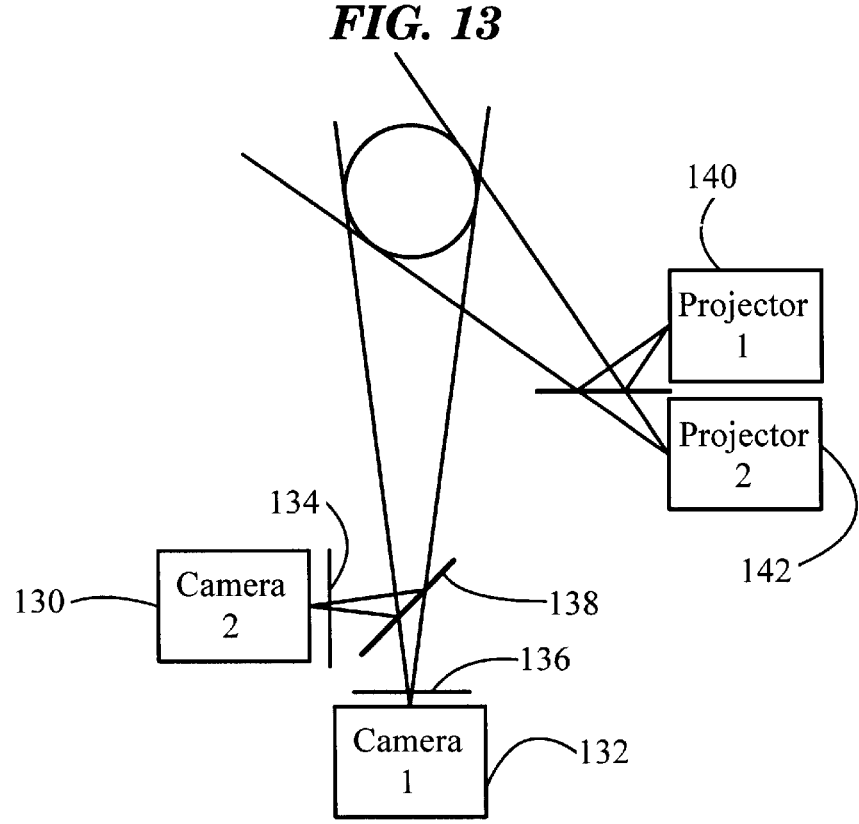
FIG. 14 is a schematic diagram of a two-camera, two-projector structured light range scanner used to compensate for varying surface reflectivities.

Biometrics: made-to-order clothing, anthropometric studies, consumer portrait sculpture, human simulation, human factors studies Graphics: virtual and augmented reality, digitizing animation models, video-conferencing Industrial: surface inspection, metrology, reverse engineering, alignment of large machinery, underwater imaging of oil rigs, cables, and ships, model recreation, non-destructive testing Medical: wound measurement, fitting of prosthetics and orthotics, planning and documentation of reconstructive surgery, aligning patients for radiation oncology Military: facility surveying, estimation of movement, driver enhanced vision, site security Robotics: pose estimation, control, navigation, collision avoidance Scientific: particle characterization, biological specimen measurement, geological feature measurement, neuro-biological measurements Television and Movies: replacement for chroma key, virtual backgrounds, virtual characters, three-dimensional freeze frame It will be clear to one skilled in the art that the above embodiments may be altered in many ways without departing from the scope of the invention. For example, while traditional visible light applications use triangulation, it is straightforward to use radiation sources that are not delivered in a straight line from the projector to the scene. Similarly, the reflected radiation does not need to travel in a straight line to the detector. Provided that the path of travel is known, straightforward geometric calculations can be made to compute ranges. In addition, the present invention may easily be extended to multiple cameras or multiple projectors, as shown in FIG. 13. It is well known that triangulation-based methods generate shadows, preventing depth calculations of the shadowed regions. Multiple projectors can be used to compensate for shadows generated by one projector. Using only a single projector 120, region 124 is shadowed, and no information about this region can be obtained. Similarly, using only projector 122, region 126 is shadowed. By using both projectors 120 and 122 projecting the same patterns, only the much smaller region 128 is shadowed, and a much more comprehensive range image can be obtained. Similarly, multiple cameras can be used to allow greater precision or to estimate surface reflectivity. One possible approach to estimating surface reflectivity is shown in FIG. 14. Each of two image detectors 130 and 132 is equipped with a different narrow-band-pass filter 134 and 136. A single captured image is provided to detectors 130 and 132 through a beam splitter 138. Two projectors 140 and 142 contain two different single-frequency or narrow-band frequency wavelength sources, corresponding to the wavelengths of filters 134 and 136. Projector 140 projects patterns, while projector 142 projects constant, uniform illumination. The measured ratio of the intensity of the reflected pattern to the intensity of the reflected constant illumination can be used to compensate for surface reflectance. Multiple cameras can also be used to combine stereo vision methods with the present invention, particularly in cases where high surface texture makes the pattern feature correspondence identification difficult.

It is important to note that while the present invention has been described in the context of a fully functional range scanning system and method, those skilled in the art will appreciate that the mechanism of the present invention is capable of being distributed in the form of a computer readable medium of instructions in a variety of forms, and that the present invention applies equally regardless of the particular type of signal bearing media or program storage device used actually to carry out the distribution. Examples of computer readable media include: recordable type media such as floppy disks and CD-ROMs and transmission type media such as digital and analog communication links. The instructions control processing of data received from the image detector and can also control pattern projection. The instructions can be in one or a number of distinct computer programs and can be stored in different computers. Accordingly, the scope of the invention should be determined by the following claims and their legal equivalents.

What is claimed is:

1. A method for real-time range scanning of a scene, the method comprising:

a) projecting a sequence of N radiation patterns onto said scene, each radiation pattern comprising a set of pattern features at fixed projection positions, wherein the pattern features are boundaries in the radiation patterns, and wherein a sequence of N matching pattern features in a corresponding set of N of said radiation patterns defines a code for one of the fixed projection positions, wherein N is a minimum number of radiation patterns required to provide unique codes;

b) using an image detector, capturing a current image of said scene, wherein said current image comprises a set of current image features corresponding to said pattern features, and wherein the current image features are boundaries in the current image;

c) identifying matching image features in a distinct image, wherein the matching image features are boundaries in the distinct image matching at least one of the current image features;

d) determining current image feature positions for some of the current image features from said code, said current image and at least one differently-timed images; and e) computing ranges for positions of said some of the current image features by geometrical analysis of said current image feature positions and said fixed projection positions.

2. The method of claim 1 wherein each fixed projection position has a unique code.

3. The method of claim 1 wherein said distinct image is a previous image corresponding to a preceding pattern.

4. The method of claim 1 wherein said code is determined from said current image and previous images corresponding to a multiplicity of preceding patterns.

5. The method of claim 1 wherein said code is determined from said current image and subsequent images corresponding to a multiplicity of succeeding patterns.

6. The method of claim 1 wherein said geometrical analysis comprises triangulation.

7. The method of claim 1 wherein said radiation patterns comprise acoustic radiation patterns.

8. The method of claim 1 wherein said radiation patterns comprise electromagnetic radiation patterns.

9. The method of claim 8 wherein said electromagnetic radiation patterns comprise radiation selected from the group consisting of visible light, infrared light, and x-ray radiation.

10. The method of claim 1 wherein said code is defined in part by changes in light intensity levels across said boundaries.

11. The method of claim 1 wherein said code is defined in part by changes in RGB values across said boundaries.

12. The method of claim 1 wherein said boundaries are stripe boundaries.

13. The method of claim 1 wherein said boundaries are uniformly spaced in said radiation patterns.

14. The method of claim 13 wherein said positions of said boundaries are in part determined by a resolution of said image detector.

15. The method of claim 1 wherein a difference between a position of one of said current image features and a position of a matching image feature is below a threshold distance.

16. The method of claim 1 further comprising estimating a spatially varying surface reflectivity of said scene.

17. The method of claim 1 further comprising selecting said radiation patterns in part in dependence on a computational efficiency of steps (c), (d), and (e).

18. The method of claim 1 wherein said radiation patterns comprise electrons.

19. The method of claim 1 wherein said boundaries comprise pixel boundaries between substantially uniform regions in said radiation pattern.

20. The method of claim 1 wherein said boundaries are pixel boundaries between individual pixels.

21. The method of claim 1 wherein said boundaries are boundaries between collections of pixels.

22. A program storage device accessible by a computer in communication with an image detector, said program storage device tangibly embodying a program of instructions executable by said computer to perform method steps for real-time range scanning of a scene, said method steps comprising:

a) receiving a current image of said scene from said image detector, wherein:

i) said scene is projected with a sequence of N radiation patterns, each radiation pattern comprising a set of pattern features at fixed projection positions, wherein the pattern features are boundaries in the radiation pattern, and wherein a sequence of N matching pattern features in a corresponding set of N of said radiation patterns defines a code for one of the fixed projection positions wherein N is a minimum number of radiation patterns required to provide unique codes; and ii) said current image comprises a set of current image features corresponding to said pattern features wherein the current image features are boundaries in the current image;

b) identifying matching image features in a distinct image, wherein the matching image features are boundaries in the distinct image matching at least one of the current image features;

c) determining current image feature positions for some of the current image features, from said code, said current image and at least one differently-timed image; and d) computing ranges for positions of said some of the current image features by geometrical analysis of said current image feature positions and said fixed projection positions.

23. The program storage device of claim 22 wherein said method steps further comprise instructing said projector to project said sequence of radiation patterns.

24. The program storage device of claim 22 wherein each fixed projection position has a unique code.

25. The program storage device of claim 22 wherein said distinct image is a previous image corresponding to a preceding pattern.

26. The program storage device of claim 22 wherein said code is determined from said current image and previous images corresponding to a multiplicity of preceding patterns.

27. The program storage device of claim 22 wherein said code is determined from said current image and subsequent images corresponding to a multiplicity of succeeding patterns.

28. The program storage device of claim 22 wherein said geometrical analysis comprises triangulation.

29. The program storage device of claim 22 wherein said radiation patterns comprise acoustic radiation patterns.

30. The program storage device of claim 22 wherein said radiation patterns comprise electromagnetic radiation patterns.

31. The program storage device of claim 30 wherein said electromagnetic radiation patterns comprise radiation selected from the group consisting of visible light, infrared light, and x-ray radiation.

32. The program storage device of claim 22 wherein said code is defined in part by changes in light intensity levels across said boundaries.

33. The program storage device of claim 22 wherein said code is defined in part by changes in RGB values across said boundaries.

34. The program storage device of claim 22 wherein said boundaries are stripe boundaries.

35. The program storage device of claim 22 wherein said boundaries are uniformly spaced in said radiation patterns.

36. The program storage device of claim 35 wherein positions of said boundaries are in part determined by a resolution of said image detector.

37. The program storage device of claim 22 wherein a difference between a position of one of said current image features and a position of a matching image feature is below a threshold distance.

38. The program storage device of claim 22 wherein said method steps further comprise estimating a spatially varying surface reflectivity of said scene.

39. The program storage device of claim 22 wherein said method steps further comprise selecting said radiation patterns in part in dependence on a computational efficiency of steps (b), (c), and (d).

40. The program storage device of claim 22 wherein said boundaries comprise pixel boundaries between substantially uniform regions in said radiation pattern.

41. The program storage device of claim 22 wherein said boundaries are pixel boundaries between individual pixels.

42. The program storage device of claim 22 wherein said boundaries are boundaries between collections of pixels.

43. A real-time range scanning system comprising:

a) a projector configured to project a sequence of N radiation patterns onto a scene, each radiation pattern comprising a set of pattern features at fixed projection positions, wherein the pattern features are boundaries in the radiation pattern, and wherein a sequence of N matching pattern features in a corresponding set of N of said radiation patterns defines a code for one of the fixed projection positions, wherein N is a minimum number of radiation patterns required to provide unique codes;

b) an image detector for capturing a current image of said scene, wherein said current image comprises a set of current image features corresponding to said pattern features, and wherein the current image features are boundaries in the current image; and c) a data processor in communication with said image detector, configured to:
  i) identify matching image features in a distinct image, wherein the matching image features are boundaries in the distinct image matching at least one of the current image features;
  ii) determine current image feature positions for some of the current image features, from said code, said current image and at least one differently-timed image; and
  iii) compute ranges for positions of said some of the current image features by geometrical analysis of said current image feature positions and said fixed projection positions.

44. The range scanning system of claim 43 wherein said data processor is further configured to instruct said projector to project said sequence of radiation patterns.

45. The range scanning system of claim 43 wherein each fixed projection position has a unique code.

46. The range scanning system of claim 43 wherein said distinct image is a previous image corresponding to a preceding pattern.

47. The range scanning system of claim 43 wherein said code is determined from said current image and previous images corresponding to a multiplicity of preceding patterns.

48. The range scanning system of claim 43 wherein said code is determined from said current image and subsequent images corresponding to a multiplicity of succeeding patterns.

49. The range scanning system of claim 43 wherein said geometrical analysis comprises triangulation.

50. The range scanning system of claim 43 wherein said radiation patterns comprise acoustic radiation patterns.

51. The range scanning system of claim 43 wherein said radiation patterns comprise electromagnetic radiation patterns.

52. The range scanning system of claim 51 wherein said electromagnetic radiation patterns comprise radiation selected from the group consisting of visible light, infrared light, and x-ray radiation.

53. The range scanning system of claim 43 wherein said code is defined in part by changes in light intensity levels across said boundaries.

54. The range scanning system of claim 43 wherein said code is defined in part by changes in RGB values across said boundaries.

55. The range scanning system of claim 43 wherein said boundaries are stripe boundaries.

56. The range scanning system of claim 43 wherein said boundaries are uniformly spaced in said radiation patterns.

57. The range scanning system of claim 56 wherein said positions of said boundaries are in part determined by a resolution of said image detector.

58. The range scanning system of claim 43 wherein a difference between a position of one of said current image features and a position of a matching image feature is below a threshold distance.

59. The range scanning system of claim 43 wherein said data processor is further configured to estimate a spatially varying surface reflectivity of said scene.

60. The range scanning system of claim 43 wherein said data processor is further configured to select said radiation patterns in part in dependence on a computational efficiency of said data processor with respect to steps (i), (ii), and (iii).

61. The range scanning system of claim 43 wherein said radiation patterns comprise electrons.

62. The range scanning system of claim 43 wherein said boundaries comprise pixel boundaries between substantially uniform regions in said radiation pattern.

63. The range scanning system of claim 43 wherein said boundaries are pixel boundaries between individual pixels.

64. The range scanning system of claim 43 wherein said boundaries are boundaries between collections of pixels.

65. A method for real-time range scanning of a scene, the method comprising:
  a) projecting a sequence of radiation patterns onto said scene, each radiation pattern comprising a set of parallel stripes defining projected pattern features at fixed projection positions, wherein the pattern features are stripe boundaries in the radiation patterns, wherein a sequence of N matching stripe boundaries at each fixed projection position in a set of N of said radiation patterns defines a code for said fixed projection position;
  b) using an image detector, capturing a current image of said scene, wherein said current image comprises a set of image stripe boundaries corresponding to said projected stripe boundaries;
  c) identifying each current image stripe boundary with a matching image stripe boundary in a previous image;
  d) determining fixed projection positions for some of the image stripe boundaries from said code, said current image and at least one preceding images, thereby identifying a fixed projection position corresponding to some of the current image stripe boundaries; and
  e) computing ranges for said some of the current image stripe boundaries by geometrical analysis of said current image stripe boundary and said corresponding fixed projection position.

66. The method of claim 65 wherein each fixed projection position has a unique code.

67. The method of claim 65 wherein said projected stripe boundaries are uniformly spaced.

68. The method of claim 67 wherein spacing between said projected stripe boundaries is in part determined by a resolution of said image detector.

69. The method of claim 65 wherein said stripe boundaries comprise pixel boundaries between adjacent stripes in said radiation pattern.

70. A method for range scanning a three-dimensional scene, the method comprising:
  a) projecting a sequence of differently-timed radiation patterns onto the scene, wherein the radiation patterns comprise, at predetermined projection positions, pattern features coded in time according to a code, wherein the pattern features are stripe boundaries in the radiation patterns;
  b) detecting image patterns produced by reflection of the projected sequence of radiation patterns from the scene, wherein the image patterns comprise image boundaries coded in time according to the code;

c) processing the image patterns using the code to determine image positions of the image boundaries coded in time according to the code; and
d) computing range information for the scene using the image positions determined using the code.

* * * * *